United States Patent

[11] 3,566,769

[72] Inventor Richard H. LeFever
1129 Highland Ave., Chester, Pa. 19013
[21] Appl. No. 856,677
[22] Filed Sept. 10, 1969
[45] Patented Mar. 2, 1971

[54] COMBINED FOOD WARMER AND BEVERAGE DISPENSER
5 Claims, 1 Drawing Fig.

[52] U.S. Cl. .................................................. 99/288
[51] Int. Cl. ............................................... A47j 31/00
[50] Field of Search ........................................... 99/290, 288, 291, 293

[56] References Cited
UNITED STATES PATENTS

| | | | |
|---|---|---|---|
| 2,121,444 | 6/1938 | Osrow | 99/327 |
| 2,638,839 | 5/1953 | Raiteri | 99/283 |
| 3,083,450 | 4/1963 | Harvey | 99/288 |
| 3,126,812 | 3/1964 | Nau | 99/290X |

*Primary Examiner*—Robert W. Jenkins
*Attorney*—Barry Moyermann

ABSTRACT: A combined food warmer and beverage dispenser includes a generally parallelepipedal boiler, adapted to contain water, and associated means to heat the water. Suspendedly mounted in one end of the boiler and kept warm by the water therein are one or more beverage urns. The other end of the boiler contains a food warming chamber, extending into the boiler and jacketed by boiler water, said chamber including an access opening occupying most of the face of this end of the boiler. The same face which contains the access opening also contains a plurality of dispensing valves. One of these valves drains hot water from the interior of the boiler for beverage use. Another valve is connected to a beverage urn and drains previously prepared hot beverage from it. Thus, a user standing at one location can obtain hot beverage, hot water and/or warm food.

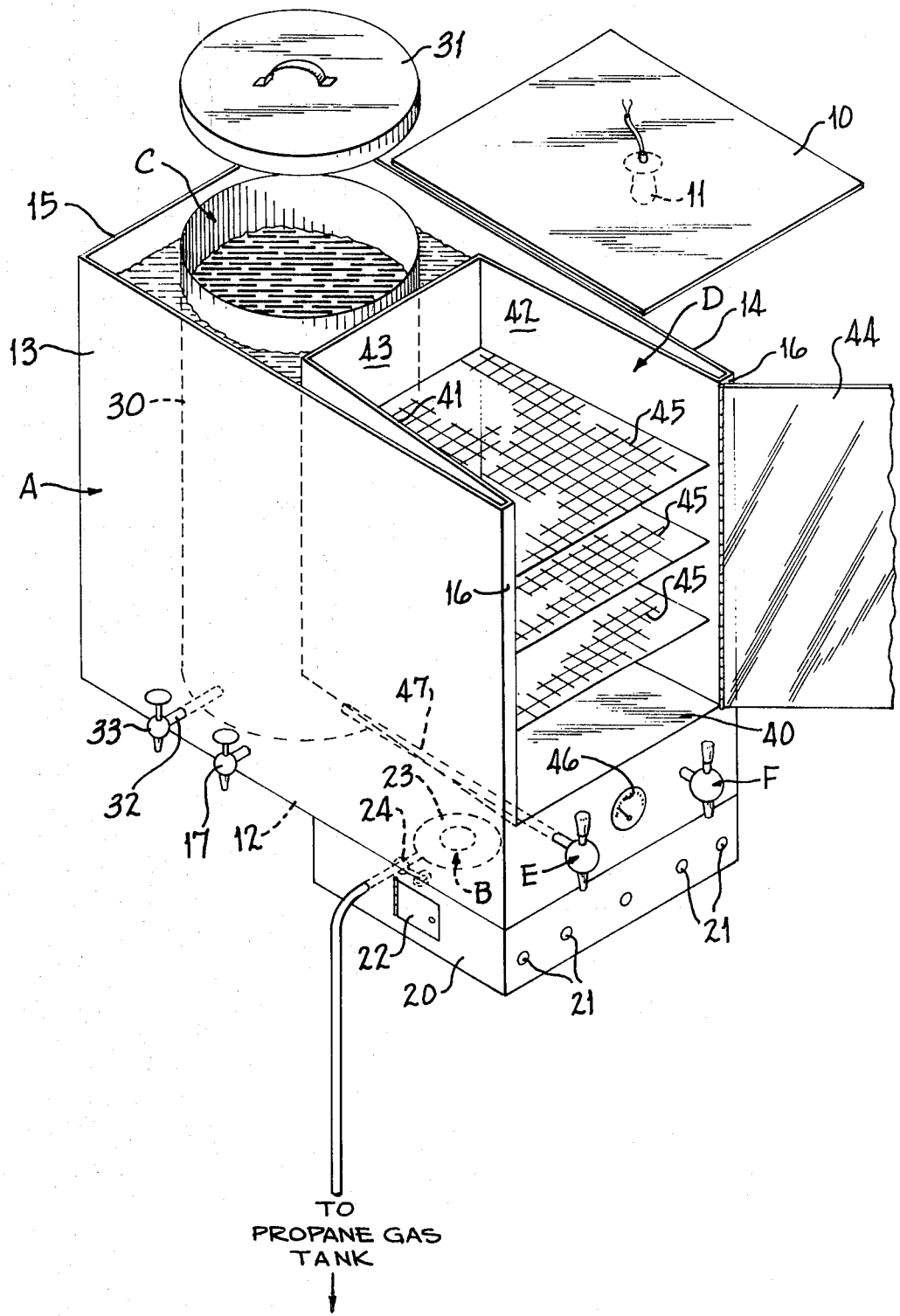

3,566,769

1

COMBINED FOOD WARMER AND BEVERAGE DISPENSER

BACKGROUND OF THE INVENTION

1. Field of the Invention

This invention pertains to food and beverage apparatus. More particularly, it pertains to infusion apparatus which includes one or more food heating devices combined therewith.

2. Description of the Prior Art

The environment of this invention is the retail sale of beverages, sandwiches, hot buns, hot pies and the like by small businessmen. Such sales are quite frequently made from the back of a panel truck driven from location to location, in conformity with factory coffee breaks and lunch periods. The driver-salesman services his customers from the vicinity of the tailgate of the truck, an area is which space is at a premium.

In the past, the tailgate has been reserved for urns of beverages whereas sandwiches, candy, warm foods, etc. are contained in racks to which access is had by raising the sides of the truck. Often, the operator who is busy dispensing beverages from the tailgate, is unable to simultaneously keep track of that merchandise accessible from the sides of the truck and to thus discourage petty thievery. Further, he has to walk from tailgate to the sides of the truck from time to time to service customers. Were the tailgate area used more efficiently, so that room could be made for beverage dispensing and the sale of sandwiches, candy, etc. from this single vicinity, many of the incidents of theft could be prevented and general sales efficiency increased as well.

While the prior art does show combined beverage dispensers and food warmers such as, for example, those described in U.S. Pat. Nos. 82,976; 1,256,424; 1,992,270; 2,121,444; 2,247,226; 2,638,839 and 3,083,450, it shows no appreciation of the environmental problem discussed above nor does it contain any suggestion that its solution may lie in a combined food warmer and beverage dispenser of novel external and internal configuration.

SUMMARY OF THE INVENTION

The invention comprises a combined food warmer and heater for beverages, combined with dispensing means, which has a generally rectangular shape, when viewed in plan. Its length is preferably several times its width and, when mounted on a counter or on the tailgate of a truck, it occupies little of the total available width. For example, typical dimensions are 1 ft. 6 inches wide by 4 ft. 0 inches long. Such a unit, mounted at the tailgate of a panel truck leaves all but 1 ft. 6 inches of the internal width available for racks or shelves containing other food items.

Briefly summarized, the invention comprises a combined food warmer and beverage dispenser which includes a generally parallelepipedal boiler (A) which has operatively associated therewith a heater assembly (B), such as a suitably housed propane fired burner. Mounted in the boiler are one or more beverage urns (C) about which the boiler water circulates as a heat-exchange medium. The urns are mounted in one end of the boiler and the other end has recessed therein a food warming chamber (D) around which boiler water also circulates. Access to the interior of the chamber is from an end of the boiler and the same end is also provided with a valve (E) for dispensing beverage from the urn and a valve (F) for dispensing hot water from the boiler.

Accordingly, it is an object of the invention to provide a rugged, inexpensive combined food warmer and beverage dispenser which permits dispensing of beverages, hot water and food from a single location while utilizing a minimum of width.

Other objects of the invention will be apparent to those skilled in the art from the description which follows.

BRIEF DESCRIPTION OF THE DRAWING

In the drawing, wherein like reference numerals indicate like parts, FIG. 1 is a fragmentary perspective view, partly exploded, representing an apparatus embodying the invention,

DESCRIPTION OF THE PREFERRED EMBODIMENT DESCRIPTION

Referring now to the drawing, which shows a preferred embodiment of the combined food warmer and beverage dispenser, boiler A will first be considered. This boiler is generally parallelepipedal having a depth several times its length, in keeping with the stated objects of the invention. It includes a removable top or cover 10 which also extends over the warming chamber D and which may, in its vicinity, be provided with a suitable light fixture 11 for illuminating the interior of the chamber. Additionally, the boiler includes a bottom 12, a first side 13, a second side 14, a distal end 15 and a proximal end 16. The construction is such that the boiler can hold and retain water which is heated therein. The boiler may be drained through a drain valve 17 in side 13. Filling is achieved by removing the top and utilizing a hose from time to time to replenish water lost by evaporation or used for food purposes. Beneath bottom 12 there is provided a heating assembly B for heating the contents of boiler A.

Heating assembly B includes a generally rectangular frame 20 which serves as both a base for boiler A and a protective housing for the burner. The frame is provided with a plurality of air inlets 21, preferably adjustable, with one or more access doors 22 and with suitable protective insulation. Within the frame there is suitably positioned and mounted a burner 23, shown as a conventional gas ring, valved as with stop 24 and supplied with gaseous fuel (e.g. propane) via conduit 25 leading from a fuel tank (not shown). Other forms of heat may be used depending on the nature of the installation (e.g. portable vs. fixed) and the energy sources available.

At least one beverage urn C is mounted within boiler A proximate end 15. The urn is of a conventional type including a generally cylindrical body and removable cover 31. The internal features (not shown) may be like those shown in urns 14 and 15 (FIG. 3) of U.S. Pat. No. 1,256,424 and include a foraminous means for holding coffee grounds or other beverage concentrate from which a hot beverage can be made by infusion. Alternatively, with the infusion means removed, the urn can be used merely for storage of previously prepared beverage. The urn is provided with a bottom drain line 32 which penetrates side 13 and is provided with a valve 33. It is further provided with a bottom outlet which will be discussed in connection with beverage valve E. The urn is mounted so that water in the boiler circulates about it to jacket it and warm its contents. The urn is filled and serviced by removing covers 10 and 31.

A food warming chamber D is recessed into the proximal end or front 16 of the boiler. The chamber includes a bottom 40, sides 41 and 42 and a back 44. The open front may be provided with a hingedly mounted, preferably transparent, door 44. The interior is provided with a plurality of shelves 45, preferably adjustably spaced-apart and also preferably foraminous to permit thermal circulation of air within the chamber. Sides 41 and 42 are spaced apart, respectively, from sides 13 and 14 so as to provide a space through which hot water in the boiler can circulate and thus jacket the warmer. For a similar reason, cylinder 30 is spaced apart from back 43, and bottom 40 is spaced apart from bottom 12.

The portion of end 16 beneath chamber D is used as a panel in which a thermometer 46 may be mounted in indicate the boiler water temperature. Also, in this same area, are mounted beverage valve E (Embodiments having a plurality of urns C require, obviously, additional valves E. These can be similarly located in the same portion of end 16. As used herein, the term beverage valve means a single valve associated with a single urn C or a plurality of valves each associated with one of a plurality of urns).

Valve E is connected to the previously mentioned bottom outlet of urn C by a beverage conduit 47 which, preferably, passes through the boiler beneath chamber C. The advantage of routing the conduit through the boiler is that beverage which remains idle in the conduit, pending use of valve E, is kept hot by virtue of heat transfer from the boiler water through the conduit walls.

Valve F, which is mounted near valve E, connects directly to the boiler and dispenses boiler water which can be used for making soup, tea and similar items which require only the addition of hot water for their preparation.

Food items which are best served warm are stored on shelves 45 on which they are easily visible and from which they can be easily removed.

The apparatus described above, which can be variously modified while still remaining within the scope of the invention, uses a minimum of width but, nonetheless, permits dispensing of beverage, dispensing of hot water and serving of warm food from a single location.

I claim:

1. A combined food warmer and beverage dispenser comprising;
    a. a generally parallelepipedal boiler including a top, a bottom, sides, a proximal end and a distal end, said boiler being capable of holding a body of water;
    b. means for heating water present in said boiler;
    c. at least one beverage urn mounted within said boiler proximate the distal end thereof and spaced apart from the bottom and sides thereof, to permit circulation of hot water thereabout, said urn including an outlet;
    d. a food warming chamber located at the proximal end of said boiler including a generally rectangular access opening occupying substantially the full width of said proximal end and extending transversely from the top of said end toward the bottom, said chamber extending into the boiler toward the distal end thereof;
    e. a first dispensing valve located in said proximal end adjacent the warming chamber access opening, adapted to draw water from said boiler;
    f. a second dispensing valve also located in said proximal end adjacent the warming chamber access opening;
    g. conduit means connecting the outlet of said urn and said second dispensing valve; and
    whereby a single unit is provided which permits dispensing of a beverage, dispensing of hot water and unloading of the contents of the warming chamber from a single access location.

2. The apparatus of claim 1 wherein said urn outlet is located at the bottom thereof.

3. The apparatus of claim 2 wherein said conduit means is located entirely within said boiler.

4. The apparatus of claim 1 wherein said warming chamber includes a plurality of adjustable shelves.

5. The apparatus of claim 4 wherein said urn is generally cylindrical, having a bottom outlet, and said conduit means is located within said boiler in heat-exchange relationship with the water therein.